(12) United States Patent
Sachs

(10) Patent No.: US 10,469,929 B2
(45) Date of Patent: Nov. 5, 2019

(54) ELECTRONIC DISPLAY SHROUD ASSEMBLE

(71) Applicant: Joseph Ernest Sachs, Hendersonville, TN (US)

(72) Inventor: Joseph Ernest Sachs, Hendersonville, TN (US)

(*) Notice: Subject to any disclaimer, the term of this patent is extended or adjusted under 35 U.S.C. 154(b) by 0 days.

(21) Appl. No.: 15/905,446

(22) Filed: Feb. 26, 2018

(65) Prior Publication Data
US 2019/0268684 A1    Aug. 29, 2019

(51) Int. Cl.
*H04R 1/08* (2006.01)
*G06F 1/16* (2006.01)

(52) U.S. Cl.
CPC .......... *H04R 1/083* (2013.01); *G06F 1/1605* (2013.01)

(58) Field of Classification Search
CPC ...... H04R 1/08; H04R 2205/021; G10H 1/32; G10H 2220/211

USPC .............. 381/363, 355, 56, 361, 306, 122
See application file for complete search history.

(56) References Cited

U.S. PATENT DOCUMENTS

| 2010/0067729 A1* | 3/2010 | Upham | G10H 1/32 |
| | | | 381/363 |
| 2015/0264824 A1* | 9/2015 | McIntyre | F16M 11/041 |
| | | | 248/314 |

* cited by examiner

*Primary Examiner* — Melur Ramakrishnaiah

(57) ABSTRACT

An electronic display shroud assembly (10) configured to be used in conjunction with a conventional microphone stand holding a conventional electronic display (D). The electronic shroud assembly includes a mounting clip (12), a quick connect coupler (14) removably mounted to the mounting clip, and a shroud (16) removably mounted to the coupler. The mounting clip has a generally C-shaped stand grasping portion (22) extending to coupler holding portion (24). The coupler holding portion also has a channel (34) configured to releasably hold the coupler. The coupler has a C-shaped body (38) and a spring loaded gate (40).

20 Claims, 2 Drawing Sheets

ELECTRONIC DISPLAY SHROUD ASSEMBLE

TECHNICAL FIELD

This invention relates to shrouds, and specifically to shroud assemblies adapted for use with microphone stands.

BACKGROUND OF THE INVENTION

For centuries, musicians have used sheet music to display the musical arrangement to be played. The sheet music is typically laid out on a pedestal or stand which is positioned in front of the musician.

Today, many musicians utilize electronic displays, such as electronic tablets, phones, or computers, to present the musical arrangement. However, such electronic displays are frowned upon by musicians.

Accordingly, it is seen that a need remains for manner of hiding an electronic display from the view of the audience while providing an unobstructed view to the musician. It is to the provision of such therefore that the present invention is primarily directed.

SUMMARY OF THE INVENTION

An electronic display shroud assembly adapted for use with an electronic display mounted to a microphone stand comprises a shroud sized and shaped to at least partially obscure an electronic display mounted to a microphone stand, a coupler releasably coupled to the shroud, and a mounting clip having a microphone stand grasping portion adapted to releasably hold a microphone stand, and a coupler holding portion adapted to receive the coupler.

DETAILED DESCRIPTION

Figure 1:
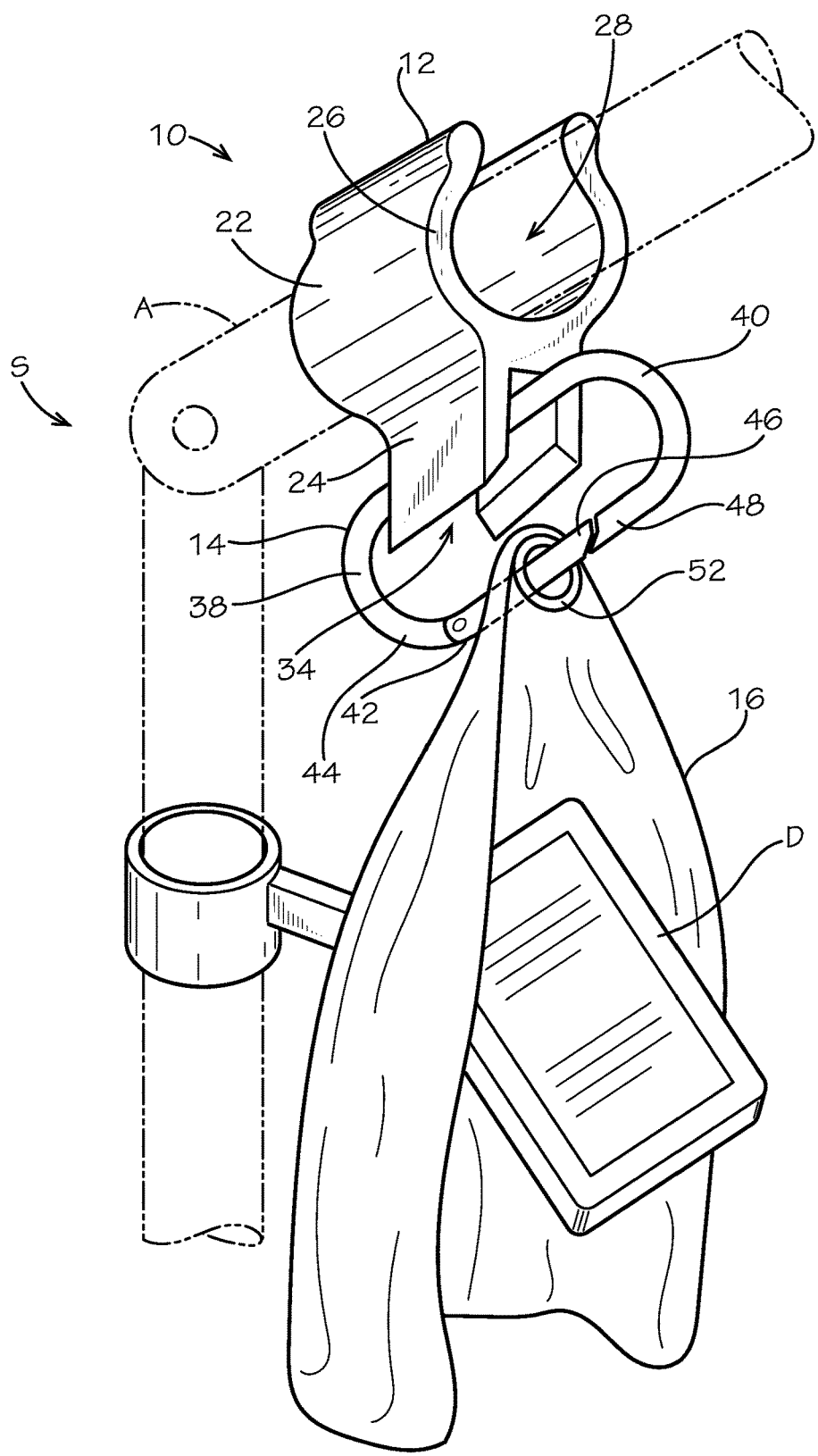
FIG. 1 is a perspective view of an electronic display shroud assembly embodying principles of the invention in a preferred form.

With reference next to the drawings, in FIG. 1 there is shown an electronic display shroud assembly 10 embodying principles of the invention in a preferred form. The electronic display shroud assembly 10 is configured to be used in conjunction with and arm A of a conventional microphone stand S, or the like, which is holding a conventional electronic display D, such as a tablet, computer, phone, or the like.

The electronic display shroud assembly 10 includes a mounting clip 12, a quick connect coupler 14 removably mounted to the mounting clip 12, and a shroud or shroud portion 16 removably mounted to the coupler 14.

The mounting clip 12 has a generally C-shaped stand grasping portion or member 22 extending to coupler holding portion 24. The mounting clip 12 is preferably made of a soft plastic, polymer or rubber material or a split metal to provide a resilient quality. The stand grasping portion has two oppositely disposed arms 26 which define a microphone stand channel 28. The arms 26 may be biased to releasably accept and compressibly hold the arm A of the microphone stand S within the microphone stand channel 28. The resilient nature of the stand grasping portion 22 allows the arms 26 to be slightly biased or splayed to allow for longitudinal movement of the stand grasping portion 22 along the microphone stand arm A or the complete release of the stand grasping portion 22.

The coupler holding portion 24 also has two opposing portions or arms 32 which define a channel 34 configured to releasably hold the coupler 14 through a compression force applied by the resilient holding portion arms 32. The arms 32 and channel 34 are configured so that the coupler 14 may be released from the coupler holding portion 24 when sufficient force is applied.

The coupler 14 has a C-shaped body 38 configured to be received and held by the coupler holding portion 24 of the mounting clip 12. The coupler 14 also has a spring loaded gate 40 pivotally coupled at a first end 42 to a pivot end 44 of the C-shaped body 38 and releasably coupled at a second end 46 to the free end 48 of the C-shaped body 38. The second end 46 is configured to mesh with the free end 48 to form a stop. The gate 40 opens or closes an opening within the body 38 to allow access or attachment to the coupler 14.

Lastly, the shroud 16 is shown in the form of a scarf or piece of fabric having an eyelet or grommet 52 therein. The eyelet may be mounted to a tag which is coupled to the shroud. It should be understood that the shroud 16 may take on many forms, such as scarves, tassels, feathered boas, plates, or any other device or material which may at least partially obscure the view of the display D from the audience.

In use, the electronic display D is coupled to the microphone stand S in conventional fashion. The mounting clip 12 is then mounted to the microphone stand arm A by forcing the microphone stand arm A past the ends of the clip arms 26 and into the microphone stand channel 28. The biasing force of the clip arms 26 maintain the position of the mounting clip 12 upon the microphone stand arm A.

The coupler 14 is then mounted to the mounting clip 12 by forcing the C-shaped body 38 between the coupler holding portion arms 32 and into coupler channel 34. The biasing force of arms 32 maintain the position of the coupler 14 within the channel 34.

The shroud 16 is then coupled to the coupler 14 by opening the coupler gate 40 and inserting the free end 48 of the C-shaped body 38 through shroud eyelet 52. The gate 40 is then allowed to pivot back to its closed position. The shroud 16 may then be moved or configured to overlay or otherwise cover the audience facing side of the electronic display D.

In covering the electronic display, it may be necessary to move the entire electronic display shroud assembly 10 to a different longitudinal position along the microphone stand arm A, i.e., the mounting clip 12 may be moved closer to or further away from the electronic display D by moving it along the microphone stand arm A, or along the upright, vertical mast or main portion of a straight (non-boom) stand. Also, the coupler 14 may be repositioned longitudinally along the coupler channel 34 of the coupler holding portion 24 to move the shroud closer to or further away from the electronic display D.

It should be understood that the sequence of connecting the mounting clip 12, coupler 14 and shroud 16 is not important, as the just described sequence for connecting such may be in any order.

Figure 2:
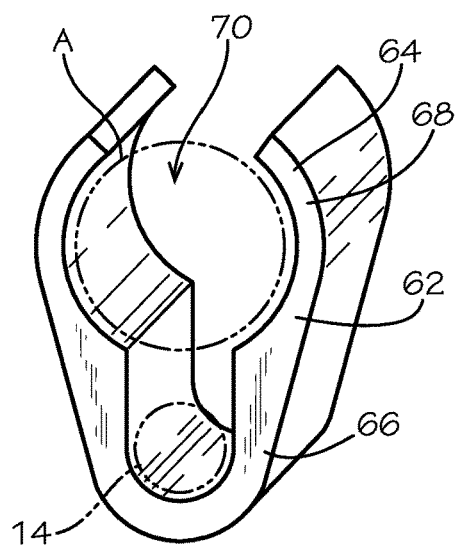
FIG. 2 is a perspective view of the mounting clip of an electronic display shroud assembly embodying principles of the invention in another preferred form.

With reference next to FIG. 2, there is shown the mounting clip 62 of an electronic display shroud in another preferred form of the invention.

Here, the mounting clip 62 has a generally C-shaped stand grasping portion or member 64 extending to coupler holding portion 66. The mounting clip 62 is preferably made of a soft plastic, polymer or rubber material or a split metal to provide a resilient quality. The stand grasping portion 64 has two oppositely disposed arms 68 which define a microphone stand channel 70. The arms 68 may be biased to releasably accept and hold the arm A of the microphone stand S within the microphone stand channel 70. The resilient nature of the stand grasping portion 64 allows the arms 68 to be slightly biased or splayed to allow for movement of the stand grasping portion 64 along the microphone stand arm A or the complete release of the stand grasping portion 64.

The coupler holding portion 66 has a U-shaped portion which define a coupler channel 78 configured to releasably hold the coupler 14 through the opening of the coupler gate 40.

Figure 3:
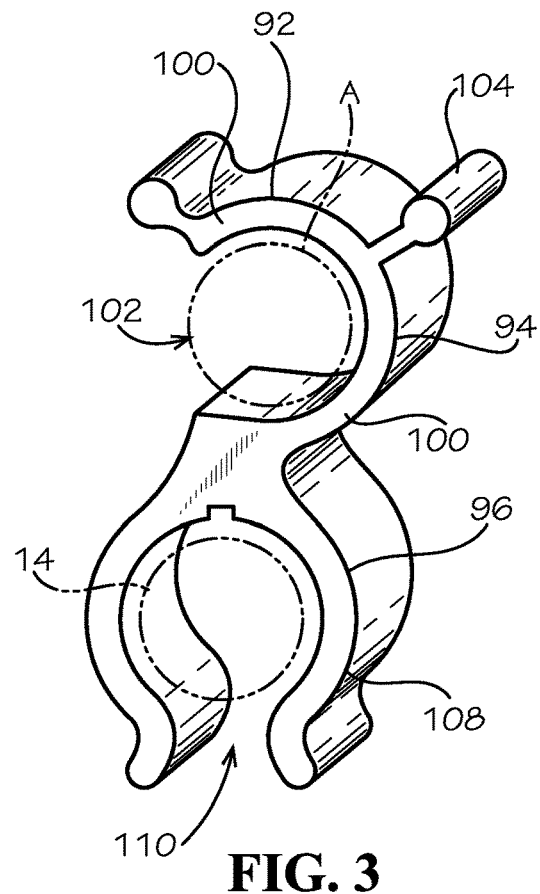
FIG. 3 is a perspective view of the mounting clip of an electronic display shroud assembly embodying principles of the invention in another preferred form.

With reference next to FIG. 3, there is shown the mounting clip 92 of an electronic display shroud in another preferred form of the invention. The mounting clip 92 has a generally tilted, C-shaped stand grasping portion or member 94 extending to coupler holding portion 96. The mounting clip 92 is preferably made of a soft plastic, polymer or rubber material or a split metal to provide a resilient quality. The stand grasping portion 94 has two oppositely disposed arms 100 which define a microphone stand channel 102. The arms 26 may be biased to releasably accept and hold the arm A of the microphone stand within the microphone stand channel 102. The resilient nature of the stand grasping portion 94 allows the arms 100 to be slightly biased or splayed to allow for movement of the stand grasping portion 94 along the microphone stand arm A or the complete release of the stand grasping portion 94 if desired. The biasing of the arms 100 is aided by projecting rails 104 which provide an element by which a person may apply pressure to the arms 100.

The coupler holding portion 96 also has two opposing portions or arms 108 which define a channel 110 configured to releasably hold the coupler 14 through a compression force applied by the resilient holding portion arms 108. The arms 108 and channel 110 are configured so that the coupler 14 may be released from the coupler holding portion 96 when sufficient force is applied.

Figure 4:
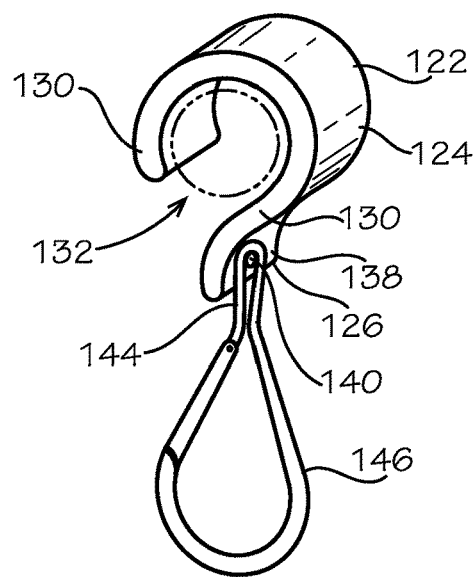
FIG. 4 is a perspective view of an electronic display shroud assembly embodying principles of the invention in another preferred form.

With reference next to FIG. 4, there is shown the mounting clip 122 of an electronic display shroud in another preferred form of the invention.

Here, the mounting clip 122 has a generally C-shaped stand grasping portion or member 124 extending to coupler holding portion 126. The mounting clip 122 is preferably made of a soft plastic, polymer or rubber material or split metal to provide a resilient quality. The stand grasping portion 124 has two oppositely disposed arms 130 which define a microphone stand channel 132. The arms 130 may be biased to releasably accept and hold the arm A of the microphone stand within the microphone stand channel 132. The resilient nature of the stand grasping portion 124 allows the arms 130 to be slightly biased or splayed to allow for movement of the stand grasping portion 124 along the microphone stand arm A or the complete release of the stand grasping portion 124 if desired.

The coupler holding portion 126 has a downwardly depending flange 136 which a hole, passage or channel 138 therethrough configured to receive a threaded bolt 140. The bolt 140 is coupled to the eye 144 of a coupler 146. Alternatively, the coupler 146 may be configured to pass directly through the channel 138 so as to eliminate the need for the bolt 140.

Figure 5:
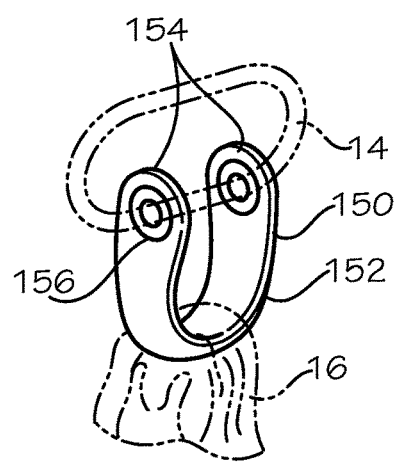
FIG. 5 is a perspective view of a shroud portion of the electronic display shroud assembly embodying principles of the invention in another preferred form.

With reference next to FIG. 5, there is shown a shroud portion, strap or loop 150. The loop 150 includes a body member 152 having two oppositely disposed free ends 154. Each free end 154 includes a eyelet or grommet 156.

In use, the loop 150 is coupled to the coupler 14 by passing a portion of the coupler 14 through the two eyelets 144 to form a U-shaped loop. The shroud 16 may then be draped through the loop 150 to hang therefrom in front of the display D or passed through the eyelet 52.

In all embodiments herein, it should be understood that the present invention may also be coupled to the upright portion of a microphone stand rather than the arm A or to a vertical microphone stand (non-boom microphone stand).

It thus is seen that an electronic display shroud assembly is now provided which overcomes problems associated with the prior art. While this invention has been described in detail with particular references to the preferred embodiments thereof, it should be understood that many modifications, additions and deletions, in addition to those expressly recited, may be made thereto without departure from the spirit and scope of the invention.

The invention claimed is:

1. An electronic display shroud assembly adapted for use with an electronic display mounted to a microphone stand, the electronic display shroud assembly comprising,
    a microphone stand;
    a shroud sized and shaped to at least partially obscure an electronic display mounted to a microphone stand;
    a coupler releasably coupled to said shroud, and
    a mounting clip having a microphone stand grasping portion adapted to releasably hold said microphone stand, and a coupler holding portion adapted to receive said coupler.

2. The electronic display shroud assembly of claim 1 wherein said microphone stand grasping portion is a resilient C-shaped member defining a microphone channel adapted to releasably receive the microphone stand.

3. The electronic display shroud assembly of claim 2 wherein said coupler holding portion has a coupler channel adapted to releasably receive said coupler.

4. The electronic display shroud assembly of claim 3 wherein said coupler channel is elongated to allow longitudinal movement of said coupler along said coupler channel.

5. The electronic display shroud assembly of claim 1 wherein said coupler includes a body portion and a gate for opening and closing an opening within said body portion.

6. The electronic display shroud assembly of claim 1 wherein said shroud includes an eyelet configured to receive at least a portion of said coupler.

7. The electronic display shroud assembly of claim 1 further comprising an elongated strap releasably coupled to said coupler to form a partial loop configured to receive said shroud.

8. An electronic display shroud assembly adapted for use with an electronic display mounted to a microphone stand, the electronic display shroud assembly comprising,
    a fabric shroud;

a coupler coupled to said shroud, and
a mounting clip having a microphone stand grasping portion adapted to hold a microphone stand, and a coupler holding portion having a coupler channel sized and shaped to compressibly hold said coupler.

9. The electronic display shroud assembly of claim 8 wherein said microphone stand grasping portion is a resilient C-shaped member defining a microphone channel adapted to releasably receive the microphone stand.

10. The electronic display shroud assembly of claim 9 wherein said coupler holding portion has a coupler channel defined by two resilient arms.

11. The electronic display shroud assembly of claim 10 wherein said coupler channel is elongated to allow longitudinal movement of said coupler along said coupler channel.

12. The electronic display shroud assembly of claim 8 wherein said coupler includes a body portion and a gate for opening and closing an opening within said body portion.

13. The electronic display shroud assembly of claim 8 wherein said shroud includes an eyelet configured to receive at least a portion of said coupler.

14. An electronic display shroud assembly adapted for use with an electronic display mounted to a microphone stand, the electronic display shroud assembly comprising,
a fabric shroud, and
a mounting clip having a first portion adapted to hold a microphone stand, and a second portion adapted to be coupled to said shroud.

15. The electronic display shroud assembly of claim 14 wherein said second portion includes a channel configured to hold said shroud.

16. The electronic display shroud assembly of claim 14 further comprising a coupler releasably coupling said shroud to said mounting clip.

17. The electronic display shroud assembly of claim 16 further comprising an elongated strap releasably coupled to said coupler to form a partial loop configured to receive said shroud.

18. The electronic display shroud assembly of claim 14 wherein said first portion is a resilient C-shaped member defining a microphone channel adapted to releasably receive the microphone stand.

19. The electronic display shroud assembly of claim 14 further comprising a coupler coupled to said shroud, and wherein said second portion has a coupler channel defined by two resilient arms configured to hold said coupler.

20. The electronic display shroud assembly of claim 19 wherein said coupler channel is elongated to allow longitudinal movement of said coupler along said coupler channel.

\* \* \* \* \*